July 1, 1924.
C. F. MEAD
DIFFERENTIAL MECHANISM
Filed Oct. 27, 1923
1,499,467
2 Sheets—Sheet 2
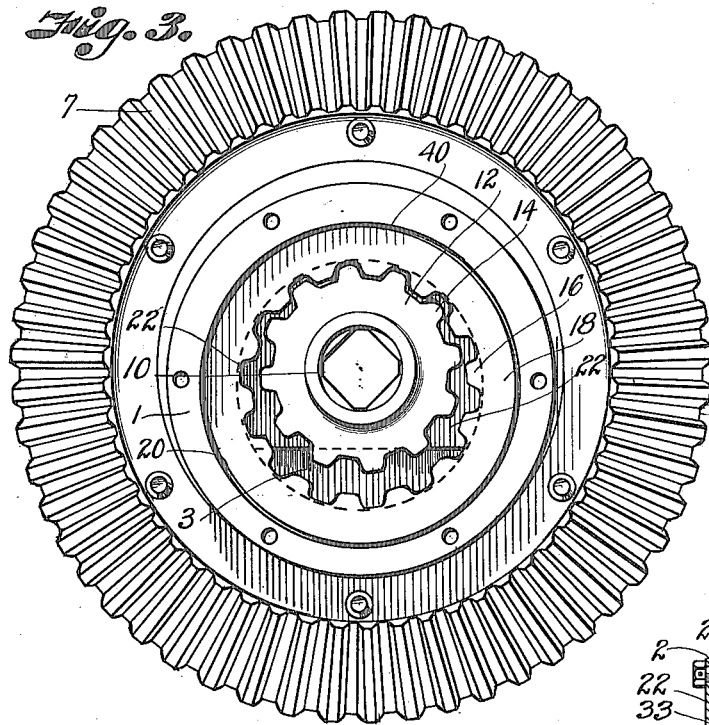
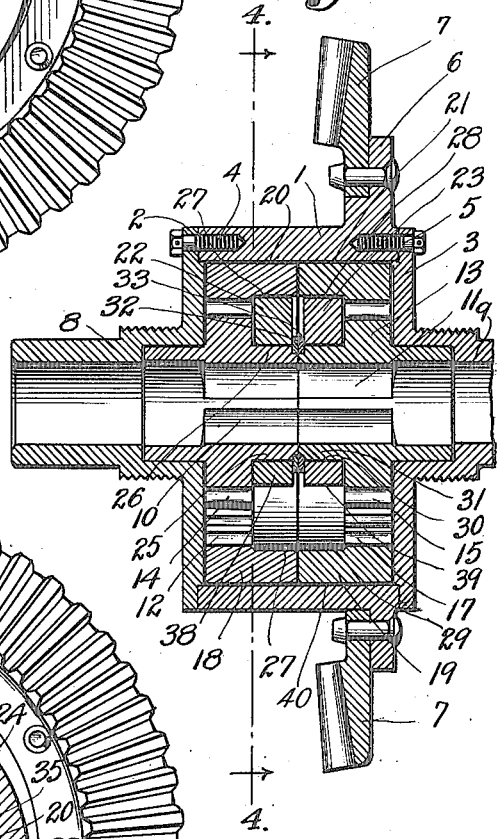
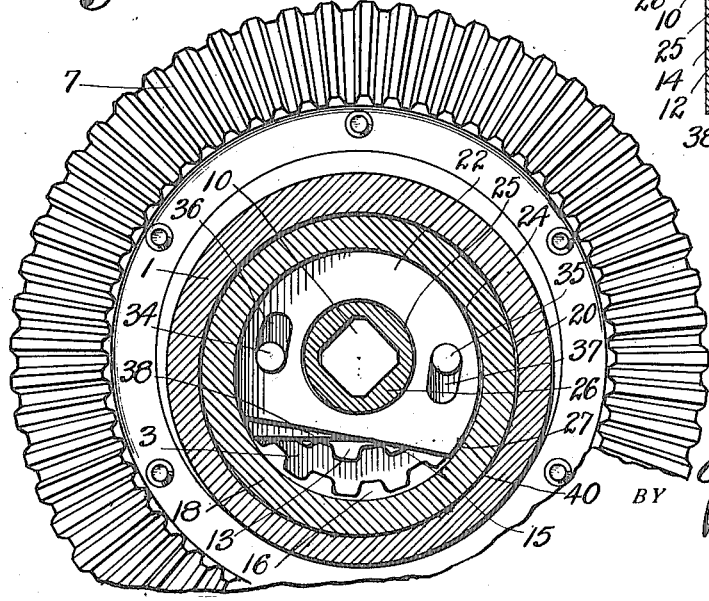
INVENTOR
Clarence F. Mead
BY
ATTORNEY Patented July 1, 1924.

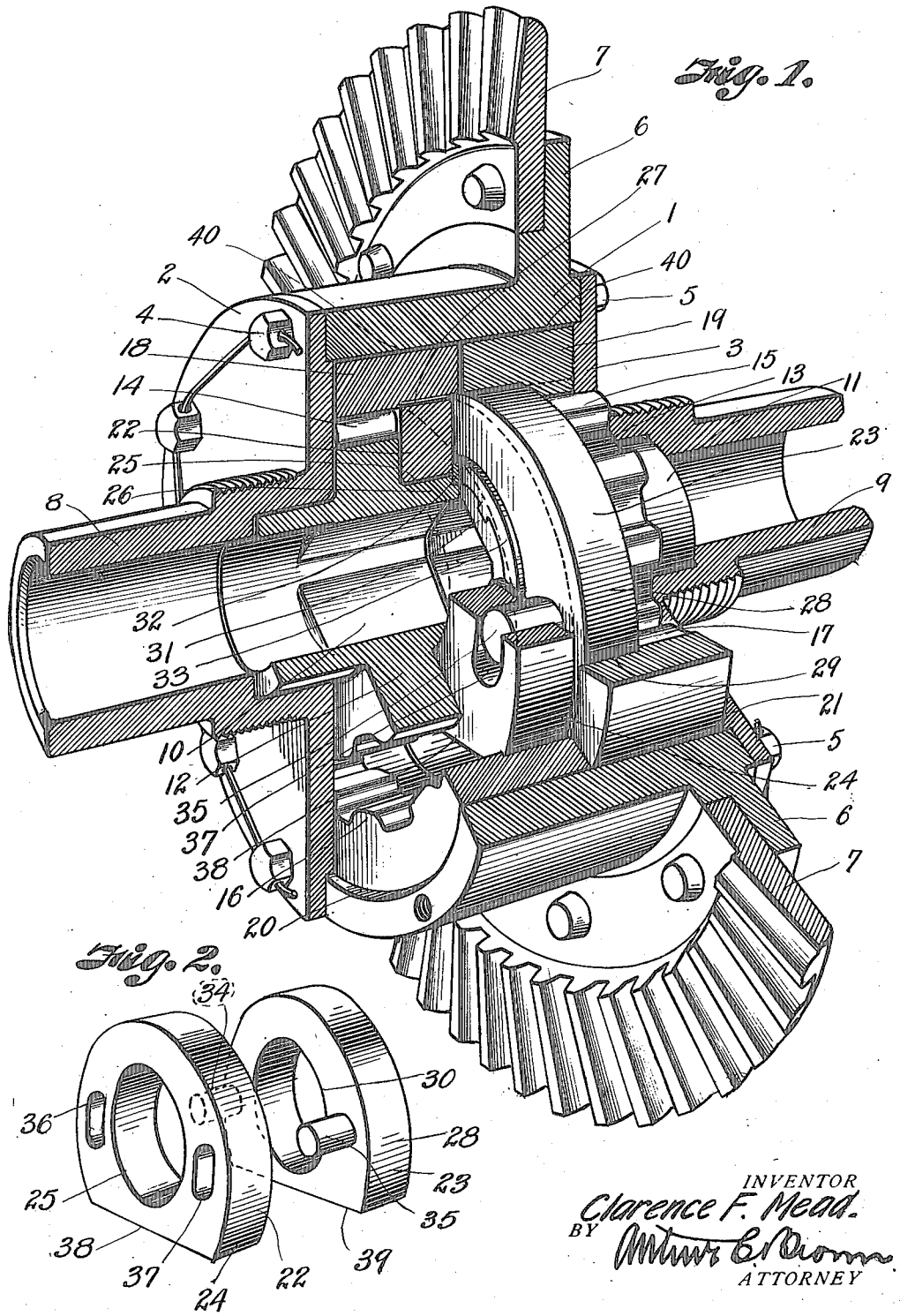

1,499,467

UNITED STATES PATENT OFFICE.

CLARENCE F. MEAD, OF LOS ANGELES, CALIFORNIA.

DIFFERENTIAL MECHANISM.

Continuation of application Serial No. 643,274, filed June 4, 1923. This application filed October 27, 1923. Serial No. 671,103.

*To all whom it may concern:*

Be it known that I, CLARENCE F. MEAD, a citizen of the United States, residing at Los Angeles, in the county of Los Angeles and State of California, have invented certain new and useful Improvements in Differential Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This application is a continuation of an application filed by me on June 4, 1923, Serial No. 643,274 for "Differential mechanism".

This invention relates to differential gearing, particularly designed for use in transmitting motion from a driving element to a divided driven element such as a split axle so that one member of the driven element may have a differential movement with respect to the other under abnormal conditions but when operating under normal conditions both members of the driven device will operate at the same speed. The invention is particularly adapted for use as a differential gearing for motor vehicles and the prime object thereof is to provide a differential gear mechanism in which the power will be divided substantially equal on the two axle members of a split axle when the motor vehicle is moving in a straight line and to permit one driven wheel carried by one of the axle members to over-run the other when differentiating and means is provided for transferring the power to the wheel having traction in the event that one wheel is over running the other or in the event that one wheel loses traction, as frequently happens when a vehicle moves over a slippery surface. In other words this invention contemplates the provision of means for accomplishing an easily constructed inexpensive mechanism which the so-called locking differentials purport to accomplish and my invention is so constructed that it will require a minimum number of parts and its organization contemplates the inclusion of well known mechanical parts and the adaptation of recognized mechanical principles, all of which will be clearly described hereinafter, reference being had to the accompanying drawings in which Fig. 1 is a perspective sectional view through a differential gearing constructed in accordance with my invention.

Fig. 2 is a perspective view of two co-operating connecting disks for causing the pinion gears to lock to the housing.

Fig. 3 is an elevational view of the gear with one end cover plate removed.

Fig. 4 is a sectional view on line 4—4 of Fig. 5.

Fig. 5 is a longitudinal sectional view through the gear.

The housing or gear case is shown as consisting of an annulus or ring 1 having two end cover plates 2 and 3 which may be secured to the ring 1 by suitable fastening devices such as bolts 4 for the cover plate 2, and 5 for the cover plate 3. The housing is provided with a circumferential flange 6 to which may be riveted or otherwise secured the master gear 7 which meshes in the usual way with the pinion on the end of the drive shaft (not shown). The cover plates have centrally disposed openings surrounded by axle receiving sleeves 8 and 9 through which the axle members of a split axle may pass to engage the annular sockets 10 and 11 of the driven pinions 12 and 13 within the housing. The driven pinions 12 and 13 are concentric with the gear 7. They are provided with teeth 14 and 15 which mesh with the teeth 16 and 17 of two ring gears 18 and 19 mounted in recesses 20 and 21 in the housing eccentric to the axis of rotation of the housing and the gear 7. The ring gears, as will be apparent from the drawings, have internal teeth which mesh with the external teeth of the pinions and since the diameters of the pinions are less than the internal diameters of the ring gears, it will also be apparent that the rotation of the housing would cause the ring gears to rotate eccentrically about the axis of the pinions if some means was not provided to lock the teeth of the pinions and ring gears together when the housing is rotated. That is there would be a tendency for the front teeth of the ring to progressively approach the teeth of the pinion to move into mesh therewith and a tendency for the rear teeth of the rings to progressively disengage and move away from the teeth of the pinions so that the internal gears would tend to idle on the pinions so that the housing would rotate carrying with it the two ring gears without driving the axles on the axle members or sleeves 10 and 11, but I have provided a novel means for positively intermittently connecting and disconnecting the housing, the ring gears and the pinions by preventing the approach and recession of the teeth of the ring gears with respect to the pinions, the specific construction of the preferred embodiments of the connecting means being best shown in detail in Fig. 2. It consists of two eccentric wedges or disks 22 and 23. The disk 22 has a periphery 24 curved concentrically with the ring gear 18 but it is provided with an opening 25 eccentric to the ring gear but concentric with its pinion 12. The disk 22 is mounted on the boss or projection 26 of the pinion and lying in a recess 27 in the ring gear, it being understood that the eccentric recesses in the case, the recesses in the ring gears, the members 22 and 23 and the openings in the members 22 and 23 are all true circles but some of them are eccentric to others. The disk 23 has a periphery 28 concentric with the recess 29 in the ring gear 19 and it has an opening 30 concentric with the boss or hub 31 on the pinion 13, the opening 30 of course being eccentric to the periphery 28. The disks 22 and 23 are spaced apart slightly by spacing washers 32 and 33 carried by the ends of the bosses on the pinions 12 and 13. The washers 32 and 33 are for the purpose of reducing friction but should the disks 22 and 23 lie flat one upon the other their face contact would create considerable more friction than is necessary or desirable and since this friction can be readily eliminated or reduced to a minimum by the washers 32 and 33, I recommend their use between the disks.

By reference to Fig. 2, it will be observed that the member 23 is provided with two studs 34 and 35 which are received in the elongated slots 36 and 37 and it will be observed that the two disks are cut away at 38 and 39. The reason for cutting away the disks is to effect a substantial balance so that when the differential is rotating the centrifugal forces will be equally distributed radially and thus eliminate liability of the members 22 and 23 releasing the ring gears due to the centrifugal force and obviously if the forces can be equally distributed about the axes of the pinions there will be no tendency of the disks to assume a neutral position under normal conditions (that is when the vehicle is moving in a straight line) and thereby destroy the driving relationship between the parts, unless the binding occurs in the normal way in which the disks are designed and it is desired to so construct the differential that while it will be sensitive enough to function under normal or abnormal conditions, it will still be rugged enough to stand rough usage to which a differential in a motor vehicle is necessarily subjected.

When the parts are assembled and power is applied to the master wheel 7 to rotate the case consisting of the members 1, 2 and 3 the ring gears will be carried around by the housing, their teeth tending to progressively approach the teeth of the pinion gears but since the disks 22 and 23 are in the recesses of the ring gears they will be carried with the ring gears causing the eccentric portions of the disks to wedge between the peripheries of the bosses of the pinion gears and the internal faces of the recessed internal gears so that the peripheries of the bosses and the internal gears will be connected in driving relation by the wedging action of the disks and since the internal gears are eccentric to the axes of the bosses they in turn will be wedged against the housing so that the housing, the internal gears, and the pinions will be driven as one. If, however, the wheel on one axle section tends to over run the wheel on the other axle section, the disk complementary to that section will be held against advancing or in neutral position so that no wedging action will take place. This can best be explained in the following manner. Assuming that the vehicle is driven in a straight line with all differential parts moving together and as the axle in axle member 11 advances it will have a tendency to advance the disk 23, but the disk 22 will lag because it is still rotating at the speed of the housing. When the disk 22 has advanced far enough to cause the studs 34 and 35 to contact with the edges of the slots 36 and 37, the further advance of the disk 23 will be arrested in a neutral position for the disk 23, that is the disk 23 cannot carry over far enough to cause a wedging action between the complementary parts of its side of the differential, consequently the pinion hub will rotate within the disk and the ring gear will rotate about the disk, permitting free differential movement or over running movement of the wheel carried by the axle connected to the socket or axle member 11. Just as soon however as the differential speed ceases the housing will pick up the disk 23 because it will start to over run and as soon as the speed of the housing is greater than the speed of the axle carried by the socket member 11. Then the parts will all move as one again. If the wheel on the axle carried by the socket member 10 over runs, then the disk 23 will be the retarded disk and the disk 22 will start to over run until its slot walls contact with the studs 34 and 35 in which event the disk 22 will be held in neutral position and the pinion 12 may differentiate with respect to the pinion 13 until the speed of the housing is greater than the speed of the axle carried by socket member 10 whereupon the disk 22 will be picked up by the over running housing and all of the parts will operate as one. In actual practice I prefer to have a slight play between the peripheries of the ring gears and the inner edges of their recesses or between the disks and the inner edges of the ring gears. The play will be hardly perceptible, just enough to allow free movement of the ring gear in the housing during differentiation, but not enough to cause sudden perceptible back-ups or chatterings when the differential gear is functioning. In other words, I do not desire to have too close clearances between the housing and the smooth frictional face of the ring gear or between the peripheries of the disks and the inner smooth face of the ring gears. The amount of clearance desired is hardly perceptible of illustration, but an exaggerated example is indicated at 40 (Figs. 1 and 4).

It will be apparent from the foregoing that I have provided a simple inexpensive rugged construction of differential gearing, well adapted to perform the functions for which it is intended and while I have specifically referred to the constructions of the various parts of the preferred form of my invention, I do not wish to be limited to the exact details shown but reserve the right to make such changes in form, proportion and minor details of construction as properly come within the scope of the appended claims.

It will be apparent of course that the casing may be provided with openings or holes properly provided for the purpose of admitting lubrication to the parts of the differential.

What I claim and desire to secure by Letters Patent is:

1. A differential mechanism comprising a rotatable housing, axle driving pinion gears mounted in the ends of the housing concentric to the axis of rotation of the housing, internally toothed rings mounted in the ends of the housing eccentric to and in mesh with the pinions, and members concentric with the rings and eccentric with the pinions, said members being effective to hold the housing, rings and pinions together against relative rotation when the housing over runs the pinions, and to permit the holding effect on one of the pinions and rings to be destroyed whenever that pinion overruns the housing so that differential action can take place.

2. A differential mechanism comprising a rotatable housing, axle driving pinion gears mounted in the ends of the housing, internally toothed ring gears eccentric to the pinions mounted in the ends of the housing in mesh with the pinions, and disks concentrically mounted within the ring gears and having eccentric openings through which part of the pinions project, said disks being effective to hold the housing, ring gears and pinions together against relative movement when the housing over runs the pinions and to permit the holding effect on one of the pinions to be destroyed whenever that pinion over runs the housing so that differential action can take place.

3. A differential mechanism comprising a rotatable housing, axle driving pinion gears mounted in the ends of the housing, internally toothed ring gears mounted in the ends of the housing eccentric to the axis of rotation of the housing and in mesh with the pinions, the peripheries of the ring gears being adapted to bind against the housing and wedging members having peripheries concentric with the inner faces of the ring gears, said wedging members having openings eccentric with the axes of the pinions through which the pinion hubs project, the wedging members being effective to hold the housing, ring gears and pinions together when the housing over runs the pinions and co-operative means on the wedging members to release the holding effect of the wedging members when one pinion over runs the other pinion so that differential action can take place.

4. A differential mechanism comprising a rotatable housing, two sets of axle driving members mounted within the housing, each set comprising a pinion, a ring gear and a wedging member, the ring gear having a friction face to engage the housing, provided with internal teeth engaged by the pinion, the wedging member being effective to maintain said teeth in fixed relation with the ring gear when the housing over runs the pinion and releasing means between the wedging members of the respective sets to cause one member to be maintained out of wedging position when the pinion of its particular set is over running the other pinion.

5. A differential mechanism comprising a rotatable housing, sets of axle driving members consisting of axle driving pinion gears mounted in the ends of the housing, internally toothed ring gears mounted in the ends of the housing eccentric to the axis of rotation of the housing in mesh with the pinions, disk members concentric with the ring gears and eccentric with the pinions, said disks being effective to hold the housing, ring gears and pinions together when the housing over runs the pinions, the disk of one set being slotted and the disk of the other set having a projection to engage the slot so that when one pinion over runs the other the disk of its particular set will have limited movement to render it ineffective to connect the pinion and ring gear in driving relation with the housing.

6. A differential mechanism comprising a rotatable housing, axle driving pinion gears mounted in the ends of the housing, internally toothed ring gears mounted in the ends of the housing eccentric to the axis of rotation of the housing in mesh with the pinions, and wedging members in recesses in the ring gears, said wedging members being concentric with the ring gears and eccentric with the pinions and spacing washers between the respective wedging members.

7. A differential mechanism comprising a rotatable housing having a chamber eccentric to the axis of rotation of the housing, ring gears in the chamber having annular housing engaging portions and internal teeth, driven pinions in the chamber concentric with the axis of rotation of the housing but eccentric with the chamber, meshing with the teeth of the ring gears, and disks having eccentric openings through which the hubs of the driven pinions project, the disks being associated with the ring gears to normally lock the ring gears, the housing and the pinions together and co-operating means on the disks to destroy the locking effect of one disk when its pinion over runs the other pinion.

8. A differential mechanism comprising a rotatable housing having a chamber eccentric with the axis of rotation of the housing, ring gears in the chamber having annular housing engaging portions and internal teeth, driven pinions in the chamber concentric with the axis of rotation of the housing but eccentric with the chamber, meshing with the teeth of the ring gears and disks having eccentric openings through which the hubs of the driven pinions project, the disks being associated with the ring gears to normally lock the ring gears, the housing and the hubs together, and co-operating means on the disks to destroy the locking effect of one disk when its pinion over runs the other pinion, said means comprising a slotted portion on one disk and a lug on the other engaging the slotted portion.

9. A differential mechanism comprising a rotatable housing, axle driven pinion gears mounted in the ends of the housing, internally toothed ring gears mounted in the ends of the housing eccentric to the axis of rotation of the housing in mesh with the pinions, and balanced members concentric with the ring gears and eccentric with the pinions, said members being effective to hold the housing, ring gears and pinions together against relative movement when the housing over runs the pinions and to release the holding effect on one of the pinions whenever that pinion over runs the companion pinion.

10. A differential mechanism comprising a differential housing having a circular recess therein, eccentric to the axis of rotation of the housing, rings having internal teeth cut part way therein and having a smooth recessed surface extending from such teeth to the opposite sides of such rings, the rings being set into the circular eccentric recess in the ends of the case and capable of turning therein, pinions meshing with the internal toothed portions of the ring, a disk on each side of the center of the differential housing placed within the recesses in the ring and capable of moving backward and forward therein, such disks being journaled upon the pinions and means for controlling the relative position and movement of such disks.

11. A differential mechanism comprising a differential housing having a circular recess therein, eccentric with the axis of rotation of the housing, rings having internal gears cut part way through and having a smooth recessed surface extending from such gears to the opposite ends of such rings, the rings being set in the ends of the circular eccentric recess in the case and capable of turning therein, axle driving pinions meshing with the internal gears in the rings, a disk upon each side of the center of the differential case journaled upon the inner hubs of the axle driving pinions, the disks being within the recesses of the rings and having forward and backward movement, and a projection on one of said disks extending into an opening in the opposite disk and capable of moving forward and backward therein to control the relative position and movement of such disks.

12. A differential gearing comprising a differential housing having a circular recess eccentric to the axis of rotation of the housing, internal gears in the recess capable of turning therein, axle driving pinions meshing with the internal ring gears, the hubs of the pinions extending outwardly, means for wedging the ring gears between the axle driving pinion hubs and the differential housing so as to cause the housing, the internal gears and the pinions to turn together when the housing over runs the pinions and means for releasing one of the pinions when the pinion travels faster than the housing.

In testimony whereof I affix my signature.

CLARENCE F. MEAD.